(12) United States Patent
Saraiva

(10) Patent No.: US 12,364,196 B2
(45) Date of Patent: Jul. 22, 2025

(54) FEEDERHOUSE TILT FRAME FOR AN AGRICULTURAL HARVESTER

(71) Applicant: AGCO do Brasil Soluções Agrícolas Ltda., Ribeirao Preto (BR)

(72) Inventor: Daniel Saraiva, Canoas (BR)

(73) Assignee: AGCO do Brasil Soluções Agrícolas Ltda., Jundiaí (BR)

( * ) Notice: Subject to any disclaimer, the term of this patent is extended or adjusted under 35 U.S.C. 154(b) by 742 days.

(21) Appl. No.: 17/635,343

(22) PCT Filed: Jun. 8, 2020

(86) PCT No.: PCT/IB2020/055364
§ 371 (c)(1),
(2) Date: Feb. 14, 2022

(87) PCT Pub. No.: WO2021/028733
PCT Pub. Date: Feb. 18, 2021

(65) Prior Publication Data
US 2022/0304230 A1     Sep. 29, 2022

Related U.S. Application Data

(60) Provisional application No. 62/885,462, filed on Aug. 12, 2019.

(51) Int. Cl.
*A01D 41/16*     (2006.01)
*A01B 63/00*     (2006.01)
(Continued)

(52) U.S. Cl.
CPC ............ *A01D 41/16* (2013.01); *A01B 63/004* (2013.01); *A01D 34/008* (2013.01); *A01D 41/142* (2013.01); *A01D 75/287* (2013.01)

(58) Field of Classification Search
CPC .... A01D 41/16; A01D 34/008; A01D 41/142; A01D 75/287; A01B 63/004
See application file for complete search history.

(56) References Cited

U.S. PATENT DOCUMENTS 3,731,470 A * 5/1973 Cornish ............... A01D 75/285
56/DIG. 15
4,266,395 A * 5/1981 Basham ............... A01D 75/287
56/16.2
(Continued)

FOREIGN PATENT DOCUMENTS

DE    4105260 A1 * 10/1991 ........... A01B 59/043
EP    0603470 A1 *  6/1994 ........... A01D 75/287
(Continued)

OTHER PUBLICATIONS

UK Intellectual Property Office, Search report for related UK Application No. GB1912727.3, dated Feb. 27, 2020.
(Continued)

*Primary Examiner* — Arpad Fabian-Kovacs

(57) ABSTRACT

A feederhouse assembly (200) for an agricultural harvester (100) includes a feederhouse (202) comprising an inlet end (204) and a body (302) adjacent the inlet end (204). The body (302) defines a crop opening (304) therethrough and a pair of curvilinear cutouts (306) laterally adjacent either side of the crop opening (304). A pair of bearings (308) is secured to the body above the crop opening (304). An agricultural harvester (100) includes a chassis (104), a feederhouse assembly (200) mounted to the chassis (104), a processing system (112) carried by the chassis (104) and structured to receive crop material from the feederhouse (202). Related methods and non-transitory computer-readable storage media are also disclosed.

8 Claims, 7 Drawing Sheets

(51) Int. Cl.
*A01D 34/00* (2006.01)
*A01D 41/14* (2006.01)
*A01D 75/28* (2006.01)

(56) References Cited

U.S. PATENT DOCUMENTS

| | | | | |
|---|---|---|---|---|
| 4,527,381 | A * | 7/1985 | Mann | A01D 75/287 |
| | | | | 56/16.2 |
| 5,918,448 | A | 7/1999 | Wheeler | |
| 8,881,495 | B2 | 11/2014 | Lohrentz et al. | |
| 9,434,252 | B2 | 8/2016 | Heindl | |
| 9,717,181 | B2 * | 8/2017 | Boyd, III | A01D 75/28 |
| 9,723,785 | B2 * | 8/2017 | Ritter | A01D 41/16 |
| 10,257,979 | B2 | 4/2019 | Walter | |
| 2002/0005033 | A1 * | 1/2002 | Uhlending | A01D 75/287 |
| | | | | 56/15.8 |
| 2006/0225396 | A1 * | 10/2006 | Rickert | A01D 41/144 |
| | | | | 56/228 |
| 2006/0254233 | A1 * | 11/2006 | Bomleny | A01D 41/141 |
| | | | | 56/10.2 E |
| 2013/0298515 | A1 * | 11/2013 | Lohrentz | A01D 41/141 |
| | | | | 56/51 |
| 2014/0041352 | A1 | 2/2014 | Johnson | |
| 2014/0360149 | A1 * | 12/2014 | Lohrentz | A01D 41/16 |
| | | | | 56/103 |
| 2016/0270290 | A1 * | 9/2016 | Johnson | A01D 75/287 |
| 2016/0278276 | A1 * | 9/2016 | De Coninck | A01D 34/008 |
| 2016/0360698 | A1 | 12/2016 | Ducroquet | |
| 2017/0013778 | A1 * | 1/2017 | Borry | A01D 41/16 |
| 2018/0153101 | A1 * | 6/2018 | Dunn | A01D 41/141 |
| 2019/0021227 | A1 | 1/2019 | Goering et al. | |

FOREIGN PATENT DOCUMENTS

| | | |
|---|---|---|
| EP | 1 159 863 A1 | 12/2001 |
| EP | 3 117 697 A1 | 1/2017 |
| GB | 1388963 A | 4/1975 |

OTHER PUBLICATIONS

European Patent Office, International Search Report related to International Patent Application No. PCT/182020/055364, mail date Sep. 3, 2020.

* cited by examiner

… (1)

FEEDERHOUSE TILT FRAME FOR AN AGRICULTURAL HARVESTER

CROSS-REFERENCE TO RELATED APPLICATION

This application claims the benefit of the filing date of U.S. Provisional Patent Application 62/885,462, "Feederhouse Assemblies, Agricultural Harvesters, and Related Methods," filed Aug. 12, 2019, the entire disclosure of which is incorporated herein by reference.

FIELD

This disclosure relates to self-propelled crop harvesting machines that include a header supported on the front end thereof, and particularly to a header attachment assembly that facilitates header lateral tilt adjustment.

BACKGROUND

Self-propelled agricultural harvesters are well known and include, by way of example, combine harvesters, windrowers and forage harvesters, all of which typically include a frame or chassis, an operator cab, an engine, and ground-engaging wheels or tracks. A cutting or pick-up header is often carried by the harvester, the header typically being considerably wider than the harvester and mounted to the front side of a feederhouse.

Crop material collected by the header is conveyed into the feederhouse before being conveyed in a generally rearward direction to crop-processing apparatus. In the case of a combine harvester, the processing apparatus serves to thresh the crop material and separate grain therefrom, whereas, in the case of a forage harvester or windrower, the crop material is typically passed through conditioning rollers.

The height of the header is typically adjusted by raising and lowering the feederhouse around a feederhouse pivot axis. A header interface frame is often pivotally mounted to the feederhouse over the front opening of the feederhouse to permit lateral adjustment around a lateral tilt adjustment axis. A hydraulic cylinder controls adjustment of the lateral tilt.

As headers get wider and heavier, larger hydraulic cylinders are required to control the lateral tilt. This places strain on the fixings and weldments, adding to the cost and complexity of the feederhouse structure. Furthermore, larger tilt angles may cause a misalignment of the crop openings of the header and the feederhouse, such that flow of crop material is negatively impacted.

BRIEF SUMMARY

In some embodiments, a feederhouse assembly for an agricultural harvester includes a feederhouse comprising an inlet end and a body adjacent the inlet end. The body defines a crop opening therethrough and a pair of curvilinear cutouts laterally adjacent either side of the crop opening. A pair of bearings is secured to the body above the crop opening.

An agricultural harvester includes a chassis, a feederhouse assembly mounted to the chassis, and a processing system carried by the chassis and structured to receive crop material from the feederhouse.

In certain embodiments, a method includes supporting a tilt frame of a harvesting header on a body carried by a feederhouse. Each of a pair of concave guides of the tilt frame is over and in contact with one of a pair of bearings secured to the body above a crop opening thereof, and each of a plurality of protrusions of the tilt frame is disposed within one of a pair of curvilinear cutouts defined in the body. The harvesting header laterally pivots about a pivot point located within the crop opening such that the bearings roll under the concave guides and the protrusions slide within the cutouts.

A non-transitory computer-readable storage medium includes instructions that when executed by a computer, cause the computer to perform such methods.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Figure 1:
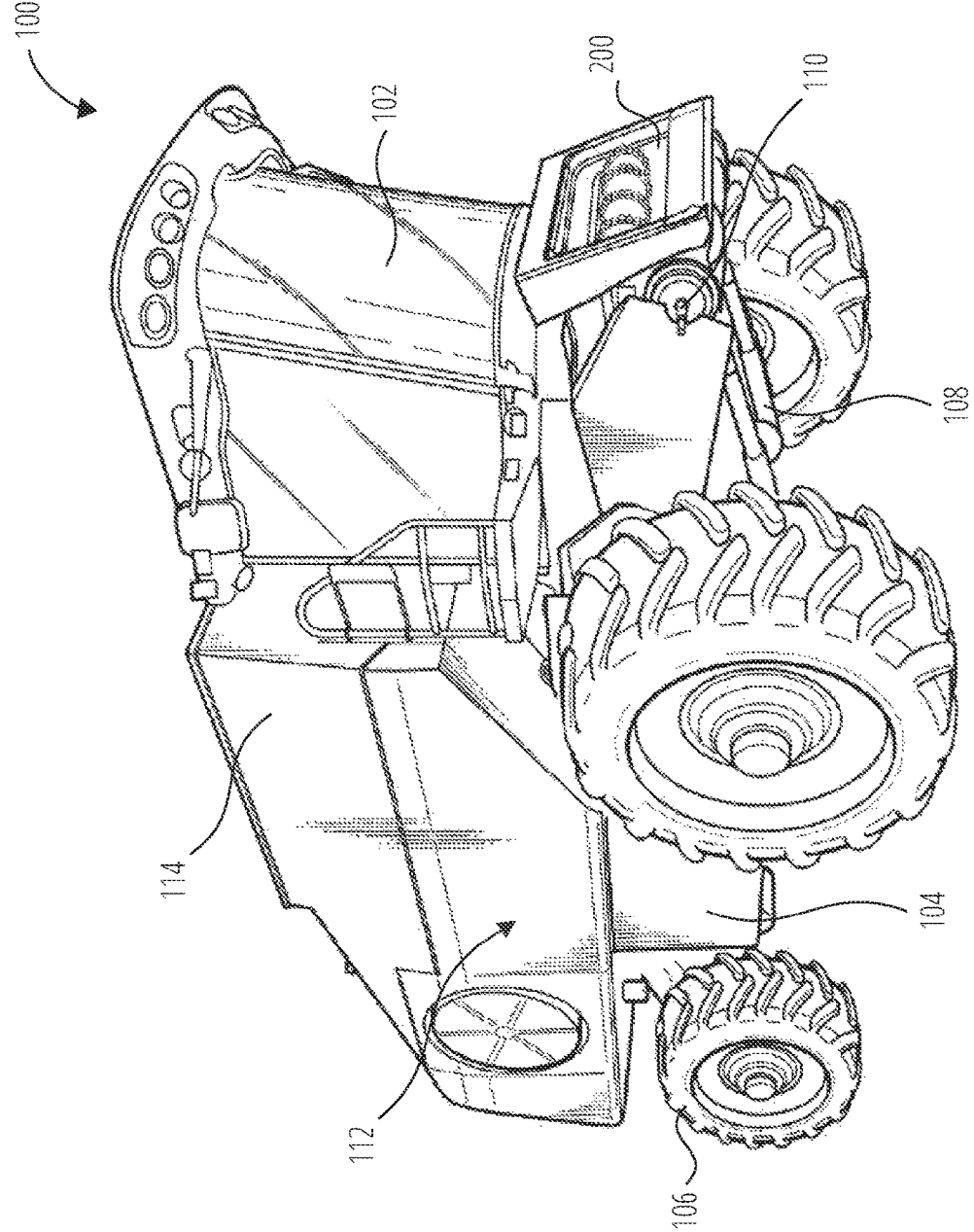
FIG. 1 is a simplified front perspective view of an example agricultural harvester.

The illustrations presented herein are not actual views of any agricultural harvester or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

FIG. 1 illustrates an example agricultural harvester embodied as a combine harvester 100. In the context of the present disclosure, the example combine harvester 100 is merely illustrative, and other machines and/or implements with like functionality may deploy certain embodiments disclosed herein, such as windrowers, forage harvesters, etc. The example combine harvester 100 is shown in FIG. 1 without a header attached, and includes a feederhouse assembly 200 carried by a chassis 104 supported by wheels 106. An operator cab 102 is mounted to the chassis 104. In some embodiments, other or additional forms of travel may be used, such as tracks. Hydraulic cylinders 108 are shown affixed to the underside of the feederhouse assembly 200 on one end and to the chassis 104 on the other end. The feederhouse assembly 200 may move (e.g., up and down, tilt, etc.) based on actuation of the hydraulic cylinders 108, which causes a detachably coupled header to also be raised, lowered, and/or tilted. A rotating shaft 110 may be configured to provide mechanical power to a header during operation of the combine harvester 100. The rotating shaft 110 may be configured to operate at various speeds, as described in, for example, U.S. Pat. No. 9,434,252, "Power Takeoff Drive System for a Vehicle," issued Sep. 6, 2016.

In general, the combine harvester 100 cuts crop materials (e.g., using the header), wherein the cut crop materials are delivered to the front end of the feederhouse assembly 200. Such crop materials are moved upwardly and rearwardly within and beyond the feederhouse assembly 200 (e.g., by a conveyer) until reaching a processing system 112 comprising a thresher rotor. In one embodiment, the thresher rotor may comprise a single, transverse rotor, such as that found in a Gleaner® Super Series Combine by AGCO. Other designs may be used, such as axial-based, twin rotor, or hybrid designs. The thresher rotor processes the crop materials in known manner and passes a portion of the crop material (e.g., heavier chaff, corn stalks, etc.) toward the rear of the combine harvester 100 and another portion (e.g., grain and possibly light chaff) through a cleaning process in known manner. In the processing system 112, the crop materials undergo threshing and separating operations. In other words, the crop materials are threshed and separated by the thresher rotor operating in cooperation with well-known foraminous processing members in the form of threshing concave assemblies and separator grate assemblies, with the grain (and possibly light chaff) escaping through the concave assemblies and the grate assemblies and to a cleaning system located beneath the processor to facilitate the cleaning of the heavier crop material. Bulkier stalk and leaf materials are generally retained by the concave assemblies and the grate assemblies and are discharged out from the processing system 112 and ultimately out of the rear of the combine harvester 100. The cleaned grain that drops to the bottom of the cleaning system is delivered by a conveying mechanism that transports the grain to an elevator, which conveys the grain to a grain bin 114 located at the top of the combine harvester 100. Any remaining chaff and partially or unthreshed grain is recirculated through the processing system 112 via a tailings return conveying mechanism. Because combine processing is known to those having ordinary skill in the art, further discussion thereof is omitted here for brevity. In embodiments in which the agricultural harvester is a windrower or forage harvester, the processing system 112 may include conditioning rollers rather than separation devices.

Figure 2:
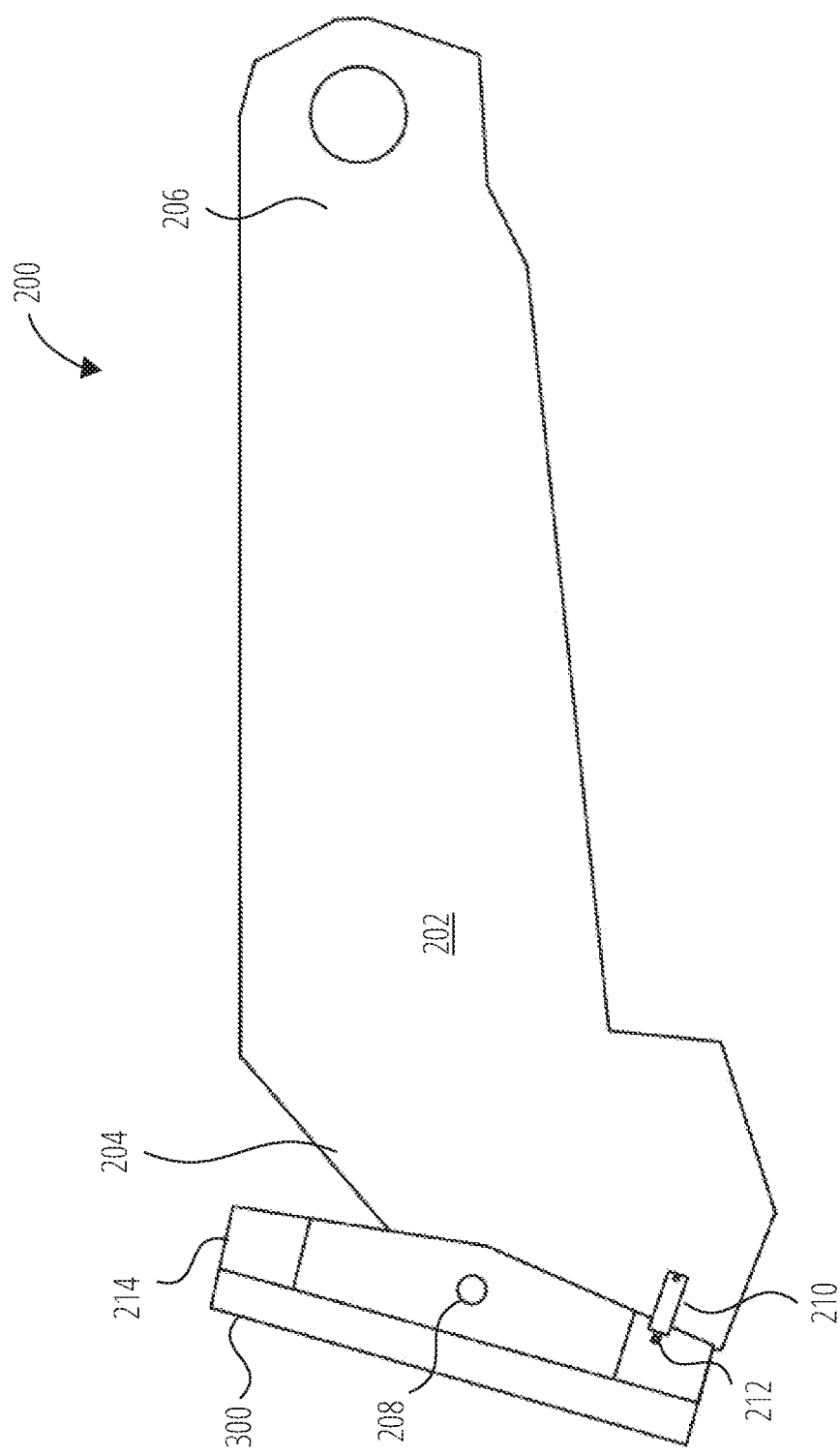
FIG. 2 is a simplified side view of a feederhouse assembly having a tilt frame, which may be a part of the agricultural harvester shown in FIG. 1.

FIG. 2 is a simplified side view of the feederhouse assembly 200 shown in FIG. 1. As shown, a feederhouse 202 has an inlet end 204 and an outlet end 206. Crop material entering the feederhouse assembly 200 from the harvesting header travels from the inlet end 204 toward the outlet end 206 on the way to the processing system 112 (FIG. 1). The harvesting header is coupled to the feederhouse 202 by a tilt frame 300, which is adjustable to control the lateral orientation of the harvesting header with respect to the combine harvester 100. Control of the harvesting header is important to enable a farmer to properly harvest crops. Adjustment of the tilt frame 300 also facilitates connecting and disconnecting the harvesting header because the tilt frame 300 can be positioned to match the orientation of the harvesting header.

The tilt frame 300 may optionally be coupled to a pitch frame 214, which itself can be adjusted by pivoting about a pivot axis 208. Actuators 210 couple the pitch frame 214 with the feederhouse 202 and are configured to adjust the angle of the pitch frame 214 about the pivot axis 208. The actuators 210 are configured to apply a force on the pitch frame 214 to rotate the tilt frame 300 attached to the pitch frame 214 upward and downward to control an orientation of a harvesting header attached to the tilt frame 300. The actuators 210 may be single-action hydraulic cylinders, double-action hydraulic cylinders, electric actuators, etc. The actuators 210 may be connected to pressure lines, electrical power, or other means to provide energy and/or signals to enable the actuators 210 to change the position of the tilt frame 300. The tilt frame 300 may rotate laterally with respect to the pitch frame 214. In some embodiments, the pitch frame 214 may be omitted, and the tilt frame 300 may be at a fixed pitch with respect to the feederhouse 202.

Figure 3:
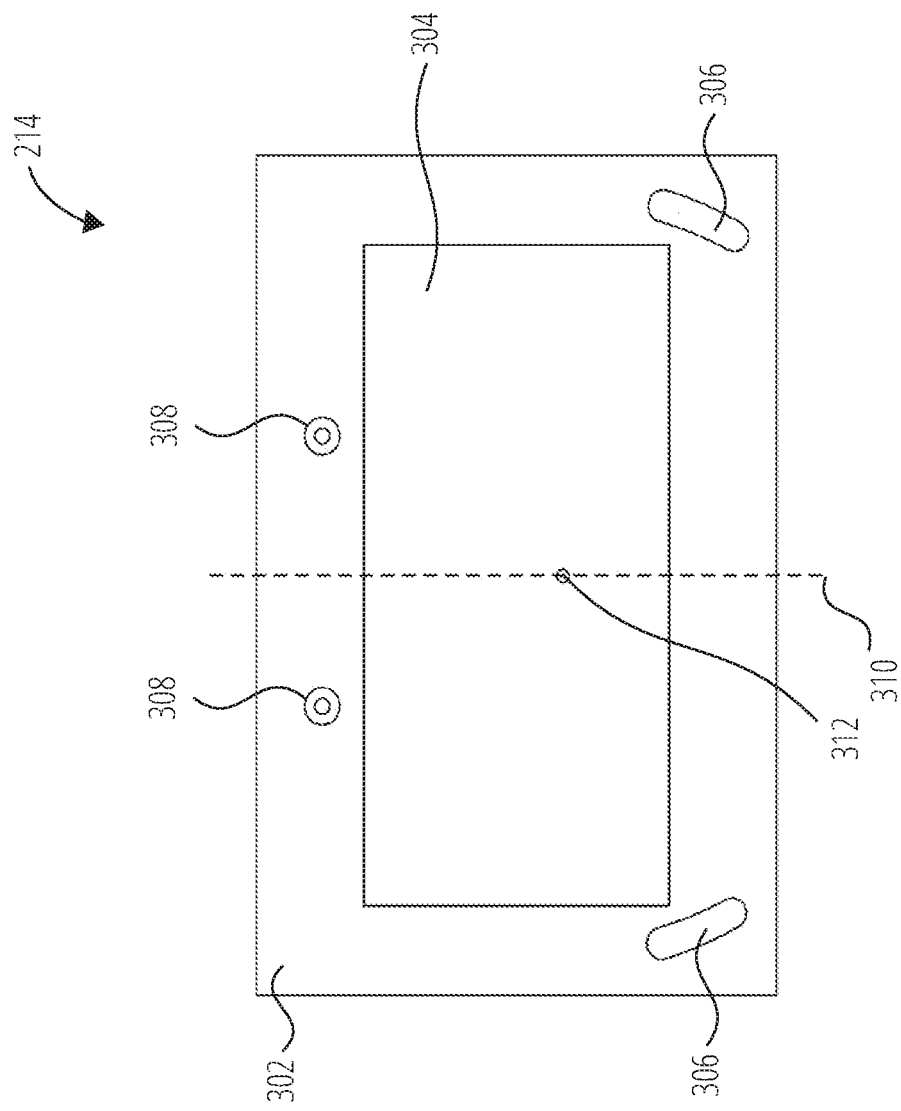
FIG. 3 is a simplified front view of the tilt frame shown in FIG. 2.

FIG. 3 is a simplified front view of the pitch frame 214, showing how it connects to the tilt frame 300. The pitch frame 214 includes a body 302 that is connected to the feederhouse 202 (FIG. 2), and that defines a crop opening 304 through which cut crop material can pass from the harvesting header to the feederhouse 202. In embodiments in which the pitch frame 214 is omitted, the body 302 may be a part of the feederhouse 202 itself. A pair of bearings 308 are secured to the body 302 above the crop opening 304. The bearings 308 may be roller bearings that allow a portion of a harvesting header to roll over them. The bearings 308 are generally horizontally level and equidistant from a centerline 310 of the body 302, such that a weight-balanced harvesting header with a tilt frame 300 resting on the bearings 308 with no other forces acting on it will rest horizontally level.

The body 302 may also define a pair of curvilinear cutouts 306 laterally adjacent either side of the crop opening 304. As depicted, the cutouts 306 may be near the bottom corners of the crop opening 304. The cutouts 306 may be shaped as arcs of a circle having a center at a pivot point 312 within the crop opening 304.

Figure 4:
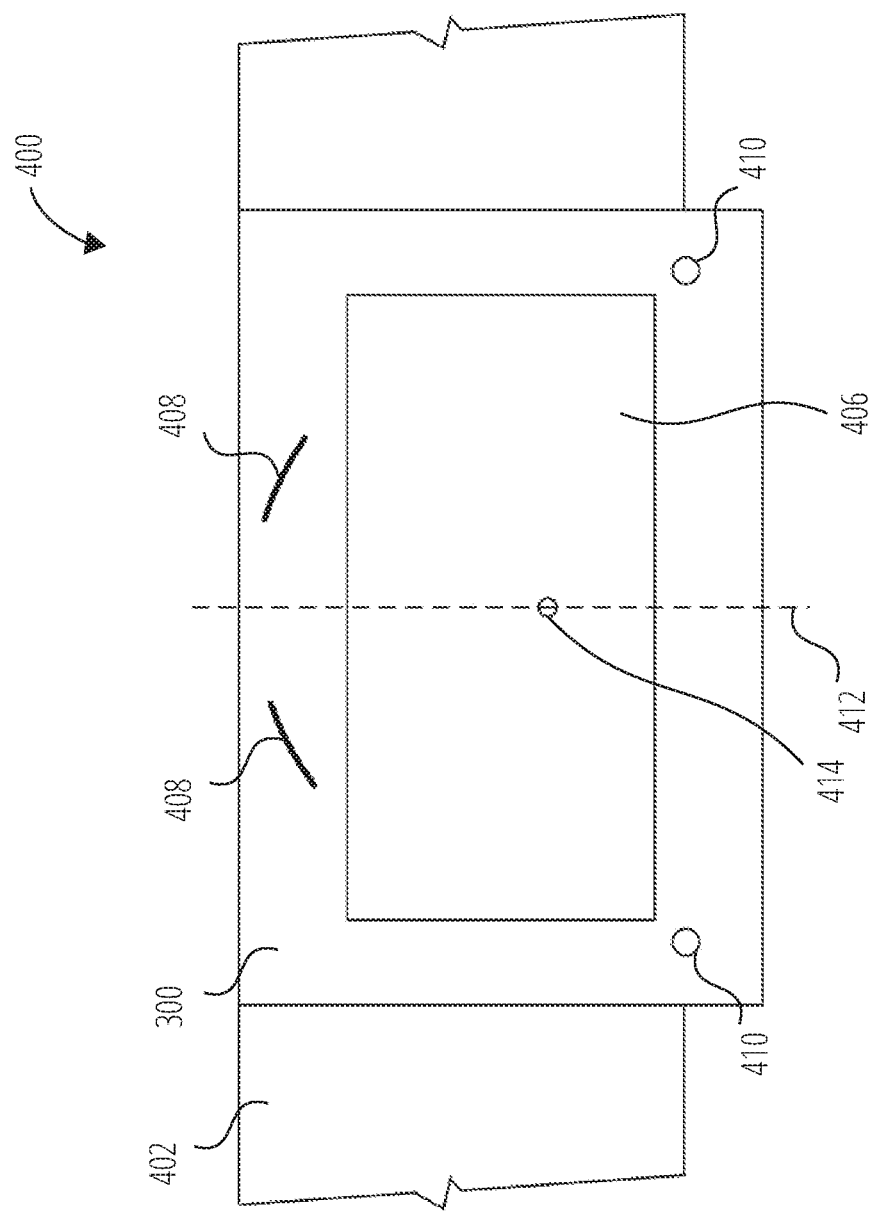
FIG. 4 is a simplified back view of a portion of a harvesting header that may be coupled to the tilt frame shown in FIG. 2 and FIG. 3.

FIG. 4 is a view of the tilt frame 300 and a portion of a harvesting header 400 configured to couple to the body 302 shown in FIG. 3. The harvesting header 400 includes a header frame 402 to which harvesting tools may be attached (and which extends to the left and right of the portion shown in FIG. 4). The tilt frame 300 is secured to or a part of the header frame 402, and is configured to couple the harvesting header 400 to the body 302. The tilt frame 300 defines a crop opening 406 through which cut crop material can pass from the harvesting tools of the harvesting header 400 to the feederhouse assembly 200.

A pair of guides 408 are secured to or integral with an upper portion of the tilt frame 300, above the crop opening 406. The guides 408 are concave, and when the harvesting header 400 is installed on the body 302 (FIG. 3), support the harvesting header 400 over the bearings 308. That is, the guides 408 are over and in contact with the bearings 308. The guides 408 may be equidistant from a centerline 412 of the harvesting header 400 and the tilt frame 300 (which may coincide with the centerline 310 of the body 302 when the harvesting header 400 is installed on the body 302). The shape of the guides 408 enable lateral (side-to-side) tilting of the tilt frame 300 with respect to the pitch frame 214. The guides 408 may be shaped as arcs of a circle having a center at a pivot point 414 within the crop opening 406 (which pivot point 414 may coincide with the pivot point 312 of the body 302 when the tilt frame 300 is installed on the body 302).

A pair of protrusions 410 are positioned on the tilt frame 300 to fit within the cutouts 306 of the body 302 when the tilt frame 300 is coupled to the body 302. The protrusions 410 may be integral with the tilt frame 300 or may be additional parts (e.g., pins, rods, posts, etc.) connected to the tilt frame 300. The protrusions 410 may be equidistant from a centerline 412 of the harvesting header 400 and the tilt frame 300. As the tilt frame 300 rotates about the pivot point 414, the protrusions 410 may slide along the cutouts 306 of the pitch frame 214.

Figure 5:
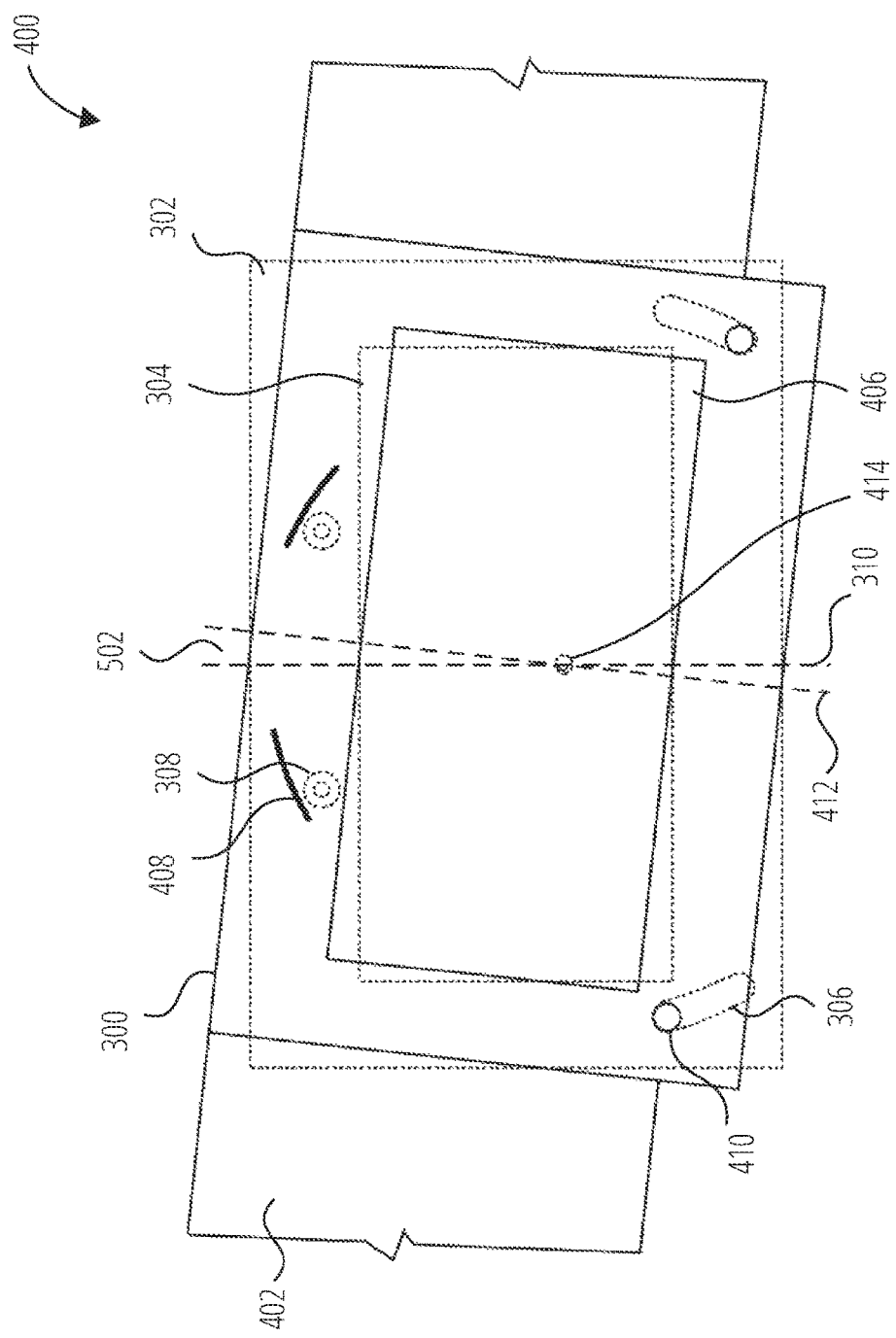
FIG. 5 is a simplified view illustrating how the harvesting header of FIG. 4 may laterally tilt with respect to the tilt frame.

FIG. 5 illustrates the harvesting header 400 mounted on the body 302 (shown in dotted lines) and rotated at an angle 502 (defined as the angle between the centerline 310 of the body 302 and the centerline 412 of the harvesting header 400 and the tilt frame 300). As shown, the guides 408 rest on the bearings 308, and the protrusions 410 are in the cutouts 306. As the harvesting header 400 rotates about the pivot point 414, the protrusions 410 may slide along the cutouts 306 and the bearings 308 may roll under the guides 408. Thus, when the harvesting header 400 rotates, the crop opening 406 remains generally aligned with the crop opening 304 of the pitch frame 214 (except for some triangular sections in the corners). By configuring the tilt frame 300 and the pitch frame 214 to have the pivot points 414, 312 in the interior of the crop openings 406, 304, the area defined by the crop opening 406 may match the area defined by the crop opening 304 better than in conventional lateral tilt mechanisms. Furthermore, the tilt mechanisms described enable decoupling of the lateral tilt (e.g., as shown in FIG. 5) from fore-and-aft tilt (e.g., pivot of the tilt frame 300 about the pivot axis 208 as shown in FIG. 2). Thus, control systems may be better able to adjust the lateral tilt without affecting the fore-and-aft tilt, and vice versa, and may keep the harvesting header 400 at a selected height with respect to a hilly field. Fine control may be particularly valuable in harvesting crops at low cutting heights.

The harvesting header 400 may include sensors and tilt control mechanisms, such as actuators (e.g., hydraulic or electric actuators) to determine and change the lateral tilt, such as those described in U.S. Pat. No. 8,881,495, "Front and Rear Ground Sensing for Header Pitch Control," issued Nov. 11, 2014; and U.S. Pat. No. 10,257,979, "Harvester Header Pitch Adjustment Apparatus," issued Apr. 16, 2019.

Figure 6:
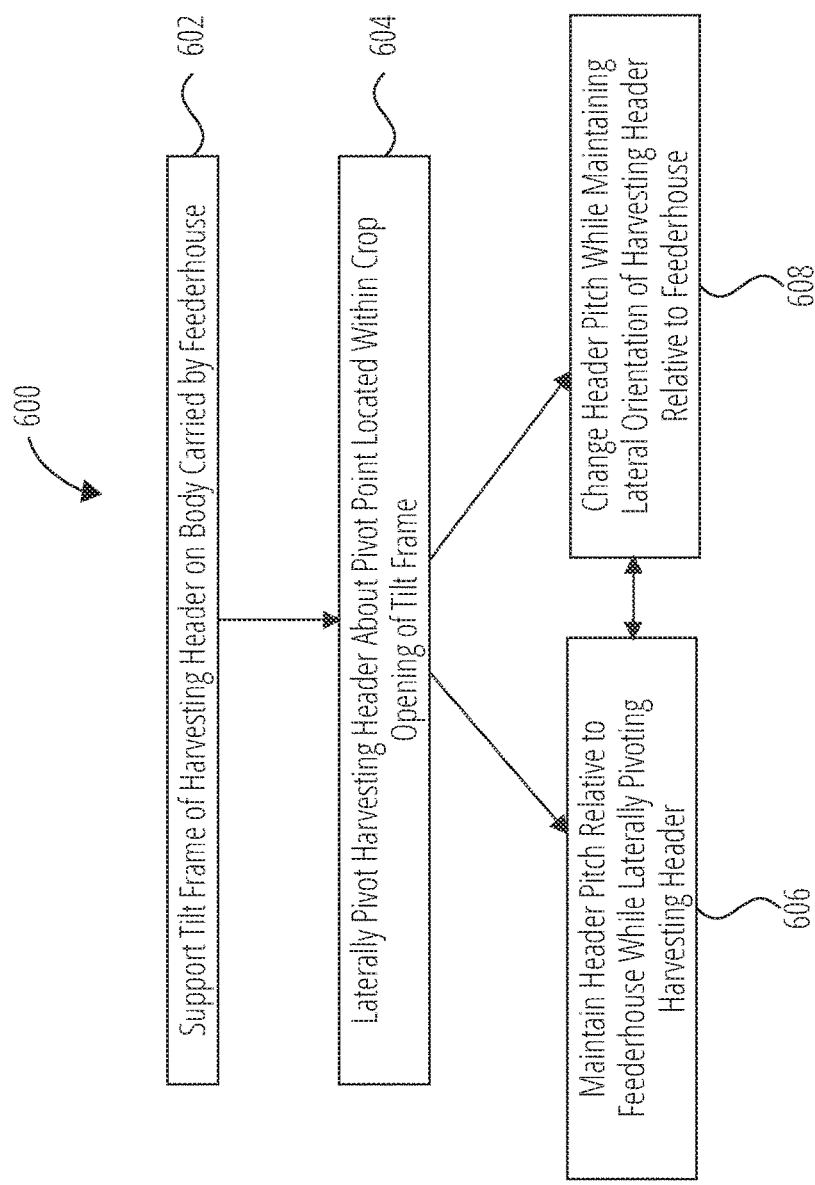
FIG. 6 is a simplified flow chart illustrating some methods of adjusting the harvesting header.

FIG. 6 is a simplified flow chart illustrating a method 600 of operating a harvesting header with combine harvester, such as the combine harvester 100 shown in FIG. 1 and having a feederhouse assembly 200 as shown in FIG. 2 and FIG. 3. As shown in block 602 of FIG. 6, a tilt frame of the harvesting header is supported on a body carried by a feederhouse. The body may be fixed to the feederhouse or a pitch frame. Each of a pair of concave guides of the harvesting header is over and in contact with one of a pair of bearings secured to the body above a crop opening thereof. Each of a plurality of protrusions of the harvesting header is disposed within one of a pair of curvilinear cutouts defined in the body.

In block 604, the harvesting header laterally pivots about a pivot point located within the crop opening such that the bearings roll under the concave guides and the protrusions slide within the cutouts.

In block 606, the harvesting header is maintained at a fixed pitch relative to the feederhouse while the harvesting header laterally pivots. In block 608, the header pitch changes relative to the feederhouse while maintaining a lateral orientation of the harvesting header relative to the tilt frame. Block 604 and block 606 are shown as separate acts, but may in some embodiments be combined into a single action. Furthermore, in some embodiments, both the pitch and the lateral tilt may be adjusted concurrently.

Figure 7:
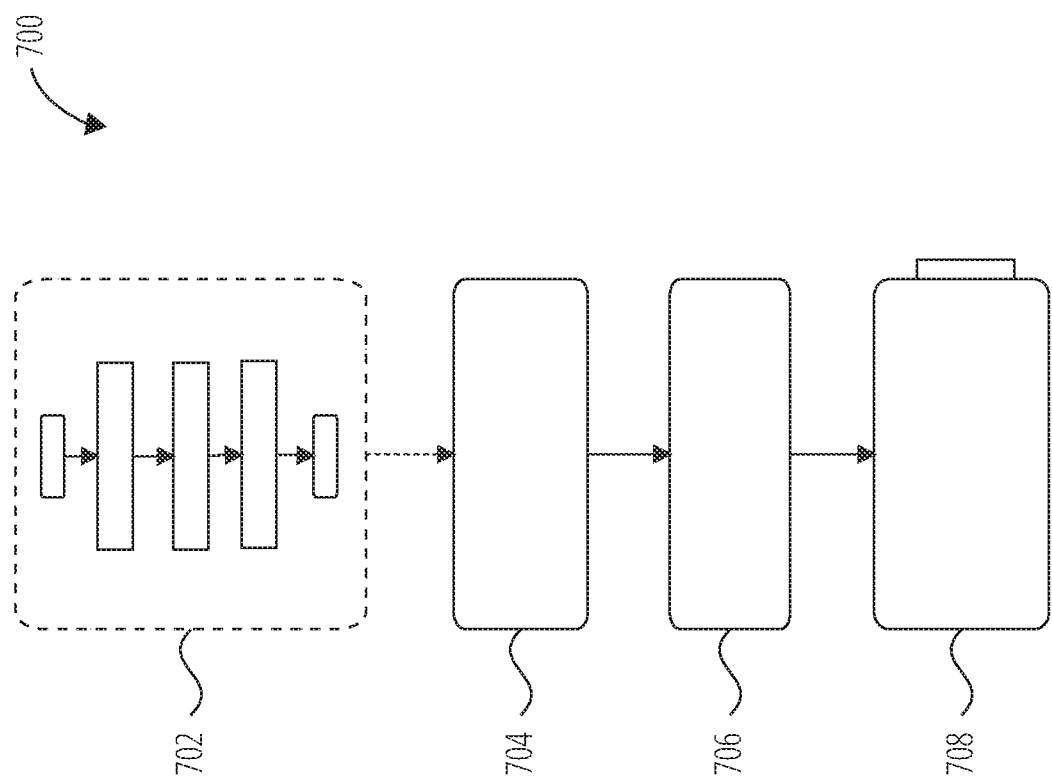
FIG. 7 illustrates an example computer-readable storage medium comprising processor-executable instructions configured to embody a method of adjusting a harvesting header, such as the method illustrated in FIG. 6.

Still other embodiments involve a computer-readable storage medium (e.g., a non-transitory computer-readable storage medium) having processor-executable instructions configured to implement one or more of the techniques presented herein. An example computer-readable medium that may be devised is illustrated in FIG. 7, wherein an implementation 700 includes a computer-readable storage medium 702 (e.g., a flash drive, CD-R, DVD-R, application-specific integrated circuit (ASIC), field-programmable gate array (FPGA), a platter of a hard disk drive, etc.), on which is computer-readable data 704. This computer-readable data 704 in turn includes a set of processor-executable instructions 706 configured to operate according to one or more of the principles set forth herein. In some embodiments, the processor-executable instructions 706 may be configured to cause a computer to perform operations 708 when executed via a processing unit, such as at least some of the example method 600 depicted in FIG. 6. Many such computer-readable media may be devised by those of ordinary skill in the art that are configured to operate in accordance with one or more of the techniques presented herein.

Additional non-limiting example embodiments of the disclosure are described below.

Embodiment 1: A feederhouse assembly for an agricultural harvester comprising a feederhouse comprising an inlet end and a body adjacent the inlet end. The body defines a crop opening therethrough and a pair of curvilinear cutouts laterally adjacent either side of the crop opening. A pair of bearings is secured to the body above the crop opening.

Embodiment 2: The feederhouse assembly of Embodiment 1, wherein the cutouts approximately define an arc of a circle centered within the crop opening.

Embodiment 3: The feederhouse assembly of Embodiment 1 or Embodiment 2, wherein the cutouts are laterally adjacent lower corners of the crop opening of the tilt frame.

Embodiment 4: The feederhouse assembly of any one of Embodiment 1 through Embodiment 3, wherein the bearings comprise roller bearings.

Embodiment 5: An agricultural harvester, comprising a chassis, the feederhouse assembly of any one of Embodiment 1 through Embodiment 4 mounted to the chassis, and a processing system carried by the chassis and structured to receive crop material from the feederhouse.

Embodiment 6: The agricultural harvester of Embodiment 5, further comprising a harvesting header having a tilt frame coupled to the body.

Embodiment 7: The agricultural harvester of Embodiment 6, wherein the tilt frame comprises a pair of concave guides, each guide over and in contact with a bearing of the pair of bearings.

Embodiment 8: The agricultural harvester of Embodiment 7, wherein the concave guides approximately define an arc of a circle centered within the crop opening.

Embodiment 9: The agricultural harvester of any one of Embodiment 6 through Embodiment 8, wherein the tilt frame further comprises a pair of protrusions positioned to fit within the cutouts when the tilt frame is coupled to the body.

Embodiment 10: The agricultural harvester of any one of Embodiment 6 through Embodiment 9, wherein the body can pivot about a pivot axis without changing a lateral tilt angle of the harvesting header.

Embodiment 11: The agricultural harvester of any one of Embodiment 6 through Embodiment 10, wherein the harvesting header can pivot laterally without changing a pitch angle of the body.

Embodiment 12: The agricultural harvester of any one of Embodiment 6 through Embodiment 11, wherein the tilt frame is configured to pivot about a pivot point defined within the crop opening of the body.

Embodiment 13: The agricultural harvester of any one of Embodiment 5 through Embodiment 12, further comprising a grain bin carried by the chassis and structured to receive grain from the processing system.

Embodiment 14: A method comprising supporting a tilt frame of a harvesting header on a body carried by a feederhouse. Each of a pair of concave guides of the tilt frame is over and in contact with one of a pair of bearings secured to the body above a crop opening thereof. Each of a plurality of protrusions of the tilt frame is disposed within one of a pair of curvilinear cutouts defined in the body. The method further comprises laterally pivoting the harvesting header about a pivot point located within the crop opening such that the bearings roll under the concave guides and the protrusions slide within the cutouts.

Embodiment 15: The method of Embodiment 14, further comprising maintaining the body in a fixed position relative to the feederhouse while laterally pivoting the harvesting header.

Embodiment 16: The method of Embodiment 14, wherein the body comprises a pitch frame, and further comprising rotating the pitch frame relative to the feederhouse while maintaining lateral orientation of the harvesting header relative to the feederhouse.

Embodiment 17: A non-transitory computer-readable storage medium, the computer-readable storage medium including instructions that when executed by a computer, cause the computer to perform the method of any one of Embodiment 14 through Embodiment 16.

All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

What is claimed is:

1. An agricultural harvester configured to move across a field to be harvested, comprising:
   a chassis;
   a feederhouse assembly mounted to the chassis, the feederhouse assembly comprising:
      a feederhouse comprising an inlet end;
      a body adjacent the inlet end, a front surface of the body defining a crop opening therethrough and a pair of curvilinear cutouts laterally adjacent either side of the crop opening;
      a pair of bearings secured to the body above the crop opening;
   a harvesting header having a tilt frame coupled to the body; wherein the tilt frame comprises a pair of concave guides, the concave guides defining an arc of a circle centered within the crop opening and each guide over and in contact with a bearing of the pair of bearings, the tilt frame further including a pair of protrusions positioned to fit within the cutouts when the tilt frame is coupled to the body, wherein the tilt frame is free to pivot with respect to the body as the agricultural harvester moves across the field with the concave guides moving over the pair of bearings and the protrusions moving in the curvilinear cutouts; and a processing system carried by the chassis and structured to receive crop material from the feederhouse as the agricultural harvester moves across the field.

2. The agricultural harvester of claim 1, wherein the cutouts approximately define an arc of a circle centered within the crop opening.

3. The agricultural harvester of claim 1, wherein the cutouts are laterally adjacent lower corners of the crop opening of the tilt frame.

4. The agricultural harvester of claim 1, wherein the bearings comprise roller bearings.

5. The agricultural harvester of claim 1, wherein the body can pivot about a pivot axis without changing a lateral tilt angle of the harvesting header.

6. The agricultural harvester of claim 1, wherein the harvesting header can pivot laterally without changing a pitch angle of the body.

7. The agricultural harvester of claim 1, wherein the tilt frame is configured to pivot about a pivot point defined within the crop opening of the body.

8. The agricultural harvester of claim 1, further comprising a grain bin carried by the chassis and structured to receive grain from the processing system.

* * * * *